United States Patent
Parker et al.

(10) Patent No.: US 7,925,768 B1
(45) Date of Patent: *Apr. 12, 2011

(54) METHOD AND NETWORK FOR ADAPTING A TRANSACTION LANGUAGE FOR NETWORK ELEMENTS

(75) Inventors: Craig Parker, Kanata (CA); Chris Ramsden, Hertford (GB)

(73) Assignee: Ciena Corporation, Linthicum, MD (US)

( * ) Notice: Subject to any disclaimer, the term of this patent is extended or adjusted under 35 U.S.C. 154(b) by 1160 days.

This patent is subject to a terminal disclaimer.

(21) Appl. No.: 10/958,676

(22) Filed: Oct. 5, 2004

Related U.S. Application Data

(60) Provisional application No. 60/510,336, filed on Oct. 10, 2003.

(51) Int. Cl.
*G06F 15/16* (2006.01)
(52) U.S. Cl. .................. 709/230; 709/250; 709/246
(58) Field of Classification Search .................. 709/230, 709/250, 246
See application file for complete search history.

(56) References Cited

U.S. PATENT DOCUMENTS

| | | | |
|---|---|---|---|
| 7,013,341 B1 * | 3/2006 | Christensen et al. | 709/230 |
| 7,099,809 B2 * | 8/2006 | Dori | 703/6 |
| 7,225,244 B2 * | 5/2007 | Reynolds et al. | 709/223 |
| 7,590,049 B1 * | 9/2009 | Fougere et al. | 370/217 |
| 2002/0120779 A1 * | 8/2002 | Teeple et al. | 709/246 |
| 2003/0200339 A1 * | 10/2003 | Greenblat et al. | 709/250 |

* cited by examiner

*Primary Examiner* — Phuoc Nguyen
*Assistant Examiner* — Mark D Fearer
(74) *Attorney, Agent, or Firm* — Christopher & Weisberg, P.A.

(57) ABSTRACT

A method and network for adapting a network management protocol (e.g., TL-1) for various transmission protocol terminologies (e.g., SDH and SONET). A network element operates in one transmission protocol mode and sends network management messages to a network management device in a managing terminology based on another transmission protocol mode. The network management device then translates the network management messages to be presented in a user interface at the network management device to an operating terminology based on the operating transmission protocol mode used by the network element.

15 Claims, 5 Drawing Sheets

METHOD AND NETWORK FOR ADAPTING A TRANSACTION LANGUAGE FOR NETWORK ELEMENTS

RELATED APPLICATION

This application claims the benefit of U.S. Provisional Patent Ser. No. 60/510,336 filed on Oct. 10, 2003, the entirety of which provisional application is incorporated by reference herein.

FIELD OF THE INVENTION

The invention relates generally to management software for managing network elements by network management devices. In particular, the invention relates to software for the adaptation and translation of network management protocols for various network transmission protocols.

BACKGROUND

The Transaction Language 1 (TL-1) is a network management protocol used for managing communications networks. TL-1 facilitates communication between a network element and a manager (i.e., software executed on a remote personal computer (PC)). TL-1 supports different types of messages, including input command messages, acknowledgments, output response messages and autonomous messages. Network elements frequently possess the ability to function in SONET networks and SDH networks. The TL-1 interface is often based on one type of network. Thus the messages utilized by TL-1 may be derived, for example, from SONET so that the names for facilities, equipment and parameters are based on SONET terminology. This approach of developing a TL-1 interface for each different terminology requires, for example, that a TL-I interface based on SDH be developed for a network element operating in an SDH environment, even if a SONET-based TL-1 is available.

SUMMARY OF THE INVENTION

In one aspect, the invention features a network for adapting a network management protocol for various transmission protocols. The network includes a storage device, a network element and a network management device. The storage device stores a set of translation rules for translating between an operating terminology and a managing terminology. The operating terminology is based on a first transmission protocol and the network management protocol and the managing terminology is based on a second transmission protocol and the network management protocol. The network element operates as a first transmission protocol node in a communications network to coordinate communications traffic based on the operating terminology, and provides a generated input string based on the managing terminology. The network management device is in communication with the storage device and in communication with the network element to receive the generated input string. The network management device includes a user interface and a translator performing translations based on the set of translation rules accessed through the storage device. The translator receives the generated input string to provide to the user interface a translated input string in the operating terminology, and the user interface receives the translated input string from the translator and provides a presentation in the operating terminology based on the translated input string.

In another aspect, the invention features a network management device for adapting a network management protocol for various transmission protocols. The network management device includes a storage device, a translator and a user interface. The storage device stores a set of translation rules for translating between an operating terminology and a managing terminology. The operating terminology is based on a first transmission protocol and the network management protocol and the managing terminology is based on a second transmission protocol and the network management protocol. The operating terminology is used by a network element operating as a first transmission protocol node in a communications network to coordinate communications traffic in the operating terminology and the managing terminology is used for communications between the network management device and the network element. The translator performs translations based on the set of translation rules accessed through the storage device. The translator receives a generated input string based on the managing terminology generated by the network element and translates the generated input string to provide a translated input string in the operating terminology. The user interface receives the translated input string from the translator and provides a presentation in the operating terminology based on the translated input string.

In another aspect, the invention features a method for adapting a network management protocol for various transmission protocols in a management network having a network management device and a network element. The method includes determining that the network element operates as a first transmission protocol node in a communications network to coordinate communications traffic in an operating terminology based on a first transmission protocol and the network management protocol, and communicates with the network management device based on a managing terminology based on a second transmission protocol and the network management protocol. The method also includes transferring to the network management device a generated input string generated by the network element in the managing terminology, providing a translated input string in the operating terminology based on the generated input string and a set of translation rules, and transferring the translated input string to a user interface for a presentation in the operating terminology at the network management device.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention relates to a method and network for adapting a network management protocol, such as the Transaction Language 1 (TL-1), to various terminologies based on various communications transmission protocols, such as SDH (Synchronous Digital Hierarchy protocol) and SONET (Synchronous Optical Network protocol). Thus, a network element operates in a mode according to one transmission protocol (e.g., SDH mode), but exchanges network management protocol messages (e.g., TL-1) with a network management device (e.g., personal computer or PC) in a single mode (e.g., SONET mode) regardless of which mode (e.g., SDH or SONET) the network element is using. The network management device adapts the network management protocol messages appropriately, for example, by translating SONET-based TL-1 messages to SDH-based TL-1 messages for presentation to a user in an SDH-based user interface. As a result, the user interacts with the user interface in a mode or operating terminology (e.g., SDH) that corresponds to the operating mode of the network element. Also, there is no requirement for the network management device and network element to install and maintain a TL-1 interface for every transmission protocol, but need install and maintain only one managing terminology or TL-1 interface (e.g., SONET-based TL-1) for communication between the network management device and the network element.

Figure 1:
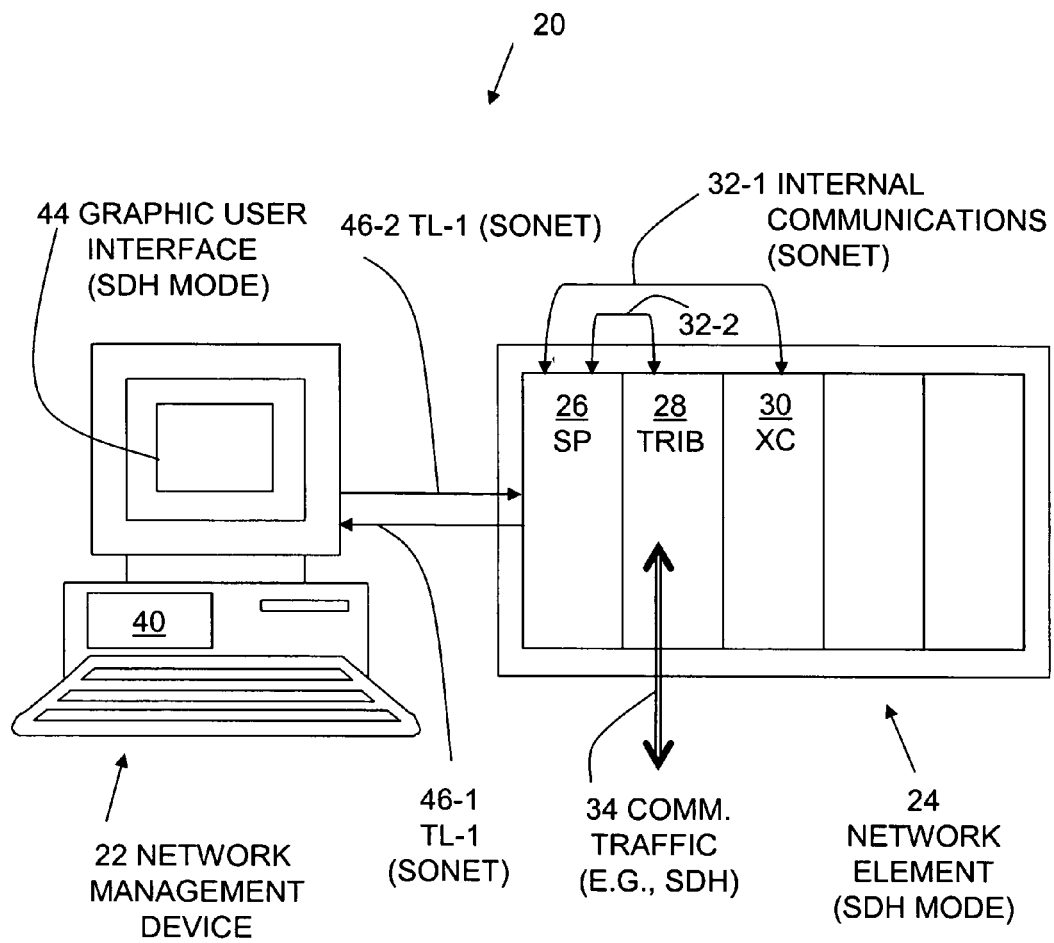
FIG. 1 is an illustration of a networked environment including a network management device and a network element in accordance with the principles of the invention.

FIG. 1 depicts an illustration of a networked environment 20 including a network management device 22 and network element 24 in accordance with the principles of the invention. The network management device 22 includes site management software 40 and a graphic user interface (GUI) presentation 44 (e.g., in SDH mode). The network element 24 includes a shelf processor (SP) card 26, one or more tributary (TRIB) cards 28, and one or more cross connect (XC) cards 30, with internal communications 32-1, 32-2 (generally referred to as international communications 32). The network element 24 transmits and receives communications traffic (e.g., SDH traffic) 34. The network management device 22 communicates with the network element 24 by input communications connection 46-1 from the network element 24 and output communications connection 46-2 to the network element 24 referred to herein generally as "communications connections 46". In one embodiment, one communications connection 46, such as a cable connection, local area network (LAN), or intranet, handles both the input communications connection 46-1 and the output communications connection 46-2.

The network management device 22 is a digital computer suitable for hosting and executing the site management software 40 and thus serving as a network manager capable of managing network devices, such as the network element 24. In one embodiment, the network management device 22 is a PC (personal computer). In other embodiments, the network management device 22 is a desktop, laptop, PDA (personal digital assistant), palmtop, server, workstation, minicomputer, or other suitable digital computer capable of serving as a network management device that can execute the management software 40 to manage the network element 24. The network management device 22 typically includes one or more microprocessors, a volatile memory (e.g., RAM or random access memory) and/or nonvolatile memory (e.g., nonvolatile hard disk or integrated circuit (IC) memory chip) for storing the instructions of the management software 40 that are hosted and executed by the one or more microprocessors of the network management device 22. The instructions configure the network management device 22 to perform the functions of the site management software application 40 (e.g., Java application) as described herein to adapt and translate communications over the communications connection 46 for various communications transmission protocols (e.g., SONET and SDH) and to present communications to a user through a GUI presentation 44 in the appropriate mode (e.g., SDH mode). In one embodiment, the site management software 40 functions generally to manage the network element 24. As used herein, the term "manage" refers to providing one or more of operations, administration, and maintenance functions for a device (e.g., the network element 24).

The network element 24 is a device that manages traffic 34 on a communications network, such as a network switch device and/or gateway network device. In various embodiments of the invention, the network element 24 is any suitable type of computing device, such as a network device, PC, desktop computer, workstation, server, or other computing device configured to provide switching, gateway, and/or other network traffic management functions. In one embodiment, the network element 24 is a switch that coordinates multiplexed optical communications traffic, such as SDH- or SONET-based traffic.

The shelf processor 26 is, in one embodiment, a processor board, such as a printed-circuit board including a microprocessor and memory. The shelf processor 26 manages a communications shelf for communications traffic 34 on the communication network. One or more tributary cards 28 are computer components or printed-circuit boards that operate in conjunction with the shelf processor 26 to receive input for and provide output for communications traffic 34. In various embodiments of the invention, the communications traffic 34 is based on transmission protocols such as SDH, SONET, and other suitable protocols for communications traffic 34.

One or more cross connect cards 30 are computer components or printed-circuit boards that operate in conjunction with the shelf processor 26 to provide links or coordination between components within the network element 24 (e.g., communications shelf). The term "internal communications 32" as used herein includes communications between cards in the network element, including the shelf processor card 26, tributary cards 28, and cross-connect cards 30.

In one embodiment, the communications connection 46 is a network or intranet between the network management device 22 and network element 24, that provides information processing and data communications within a company or organization. In one embodiment, the communications connections 46 are based on a packet switching network, such as an Internet Protocol (IP). The communications connections 46 are not limited to a particular type of communications connection or network, but can be any network or connecting communications line suitable for connecting a network management device 22 and a network element 24.

In one embodiment, the network element 24 is configured for an SDH mode and operated in accordance with the principles of the invention. The behavior of the network element 24 is consistent with SDH rules and attributes. For example, protection switching is implemented according to SDH. There is a single TL-1 interface between the user and the network element 24 which is based on a managing (e.g., SONET) terminology regardless of the mode of the network element 24, which is operating as an SDH node. The communications connections 46 are based on the managing terminology (e.g., a single SONET-based TL-1 interface) for communications between the user at the network management device 22 and the network element 24. There is no switching of the managing terminology (e.g., SONET-based TL-1 interface) between modes based on whether the network element 24 is operating in SONET mode or SDH mode. However, the site management software 40 executing on the network management device 22 determines that the operating terminology or mode of the network element 24 is in one terminology (e.g., SDH) and generates a GUI presentation 44 to present information to the user in the same operating terminology (e.g., SDH format). The advantage to this configuration is the standardization of communications between the network management device 22 and the network element 24, and internal communications 32 in the network element 24, to a single managing terminology or set of commands (i.e., SONET-based commands).

Figure 2:
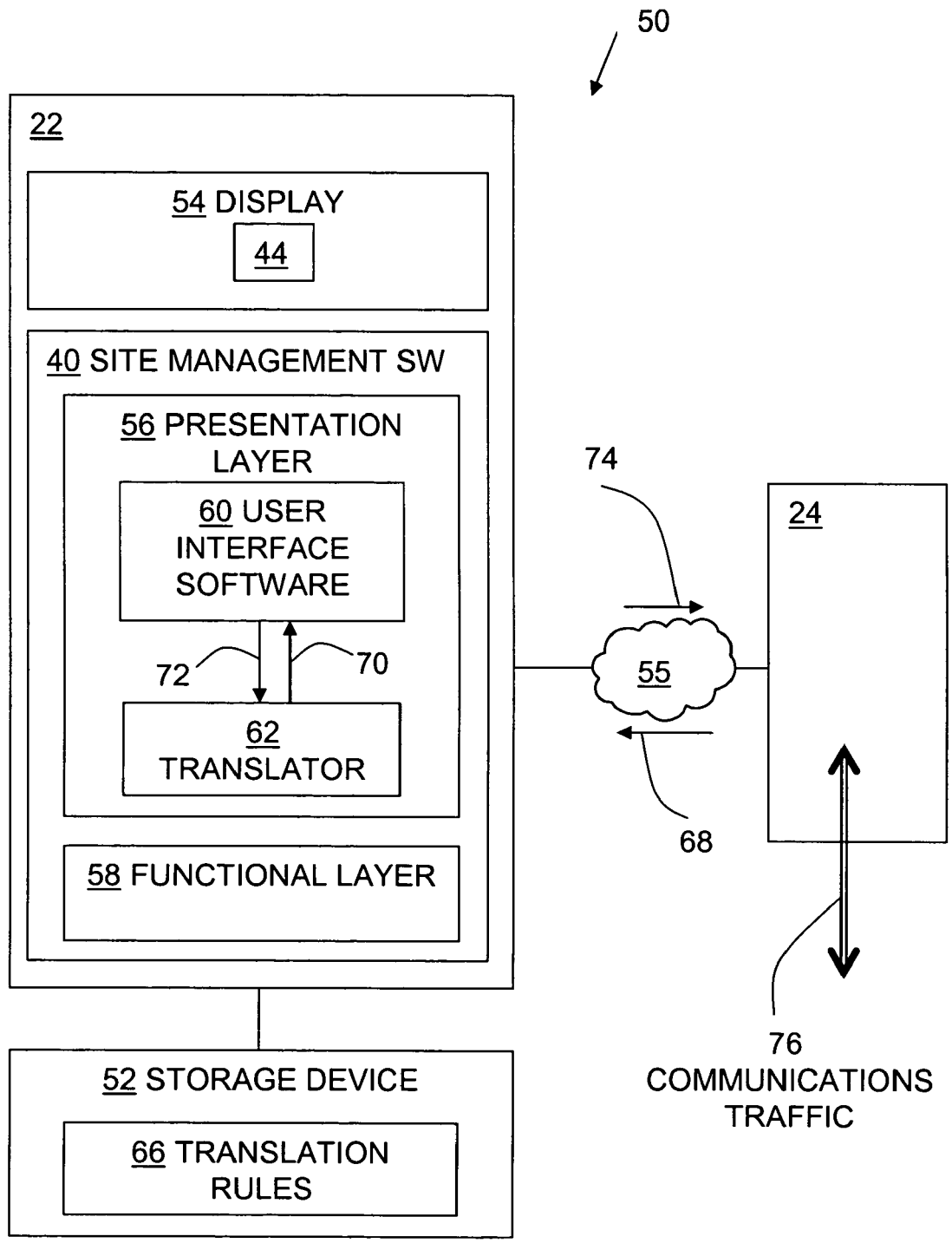
FIG. 2 is a functional block diagram of a networked environment including a network management device and a network element in accordance with the principles of the invention.

FIG. 2 is a functional block diagram of a networked environment 50 including a network management device 22 and a network element 24 in accordance with the principles of the invention. The network management device 22 includes a display 54, and site manager software 40 that includes a presentation layer 56 and a functional layer 58. The network management device 22 also connects to a storage device 52. The network element 24 receives and transmits communications traffic 76 over a communications network (not shown). The network element 24 provides a generated input string 68 to the network management device 22 and receives a translated output string 74 from the network management device 22 over a network 55 between the two devices 22, 24.

The storage device 52 is a digital storage device, such as a disk, tape, nonvolatile memory, or other device suitable for storing digital data (e.g., files) for use with a digital computing device, such as the network management device 22. In one embodiment, the storage device 52 is part of the network management device (e.g., located within the same physical box) or connected directly, such as by a cable. Alternatively, the storage device 52 is located on a network, such as a local area network (LAN) or storage area network (SAN). In another embodiment, the storage device 52 is accessible by the network management device 22 through the network 55 between the network management device 22 and the network element 24. The network 55 is a LAN, intranet, Internet Protocol (IP) based network, SAN, or other suitable network for providing communications connections for the network management device 22 and the network element 24, as well as the storage device 52 (if the storage device 52 is accessible through the network 55)

The storage device 52 stores a set of translation rules 66 that provide rules for translating from one network management terminology to another, such as between an operating mode terminology (e.g., SDH-based TL-1 messages) and a managing mode terminology (e.g., SONET-based TL-1 messages). In one embodiment, the translation rules 66 are based on a markup language, such as SGML (Standard Generalized Markup Language), for example, XML (eXtended Markup Language).

The display 54 is a visual display that is part of or associated with the network management device 22. In various embodiments, the display is a CRT (cathode ray tube) or LCD (liquid crystal display), or other display device suitable for use with a digital computing device.

In one embodiment, the presentation layer 56 is a software layer or program including a user interface 60 and a translator 62. The user interface 60 creates and manages a presentation 44 (e.g., GUI presentation) presented on the display 54. Alternatively, the user interface 60 is not limited to generating the presentation 44 in a graphics mode, but generates presentations 44 in one or more other user interface modes (e.g., text, audio, and/or tactile modes). The translator 62 provides translation functions using translation rules 66 to adapt a network management language (e.g., TL-1) for different terminologies, such as an operating terminology in a SDH mode, and a managing terminology in a SONET mode. The translated input string 70 is communicated from the translator 62 to the user interface 60, and the user interface output string 72 is communicated from the user interface 60 to the translator 62. In one embodiment, both strings communicate through internal data transfer connections of the network management device 22, such as an internal bus (not shown). The functional layer 58 is a software layer or program that provides functional logic or programming for the network management device 22. In the illustrated embodiment, the presentation layer 56 and functional layer 58 are part of the site management software 40. Alternatively, one or more individual components (e.g., user interface 60 and/or translator 62) are implemented on a network management device 22 independently of the site management application 40. In one embodiment, the presentation layer 56 and/or components, such as the user interface 60 and the translator 62, are implemented as one or more Java applications or C++ applications, or based on one or more other suitable software languages or environments.

In another embodiment, one or more components (e.g., user interface 60 and/or translator 62) of the presentation layer 56 are implemented as hardware modules or integrated circuit (IC) devices, such as ASIC (application specific IC) or PGA (programmable gate array) devices.

Prior to the present invention, earlier implementations of network site management software 40 typically used one TL-1 implementation based on SONET terminology and another TL-1 implementation based on SDH terminology. The particular TL-1 implementation used was based on the native terminology of the network element 24. In accordance with the invention, the presentation software layer 56 manages translation of the terminology (e.g., managing terminology in SONET mode) to the mode (e.g., operating terminology in SDH mode) of the network element 24. For example, because the TL-1 implementation is restricted to SONET, no translation is required if the network element 24 were operating in SONET mode. However, because the network element 24 is operating in SDH mode, the translation rules 66 (e.g., a set of rules and library translations) are used with the SONET output 68 generated at the network element 24 in the managing terminology to convert it to the operating terminology (e.g., SDH format) for presentation to the user. In addition, the translator 62 provides inverse operations (e.g., translation from SDH to SONET terminology) according to the principles of the invention. For example, the translator 62 converts a user interface output string 72 in the operating terminology (e.g., SDH-based TL-1 commands generated by the user through the GUI) to a translated output string 74 for communication to the network element 24 in the managing terminology (e.g., as SONET-based TL-1 commands).

In one embodiment, the network management protocol (e.g., TL-1) translation rules 66 are implemented as XML files used to decompose SONET parameters into SDH parameters for presentation to an SDH user. Advantageously, software underneath the presentation layer 56 in the functional layer 58 generally does not have to be modified according to the different modes of the network element 24. Where logical functionality is required, the functional layer 58 (e.g., components of the network management software under the presentation layer 56) include both SONET and SDH logic. If a new mode is available for a network element 24, the translation rules 66 (e.g., rules sets) are expanded accordingly, and the translation is implemented in the presentation layer 56. Thus, hybrid modes that do not strictly conform to SONET or SDH can be accommodated by the addition of new sets of translation rules 66.

Figure 3:
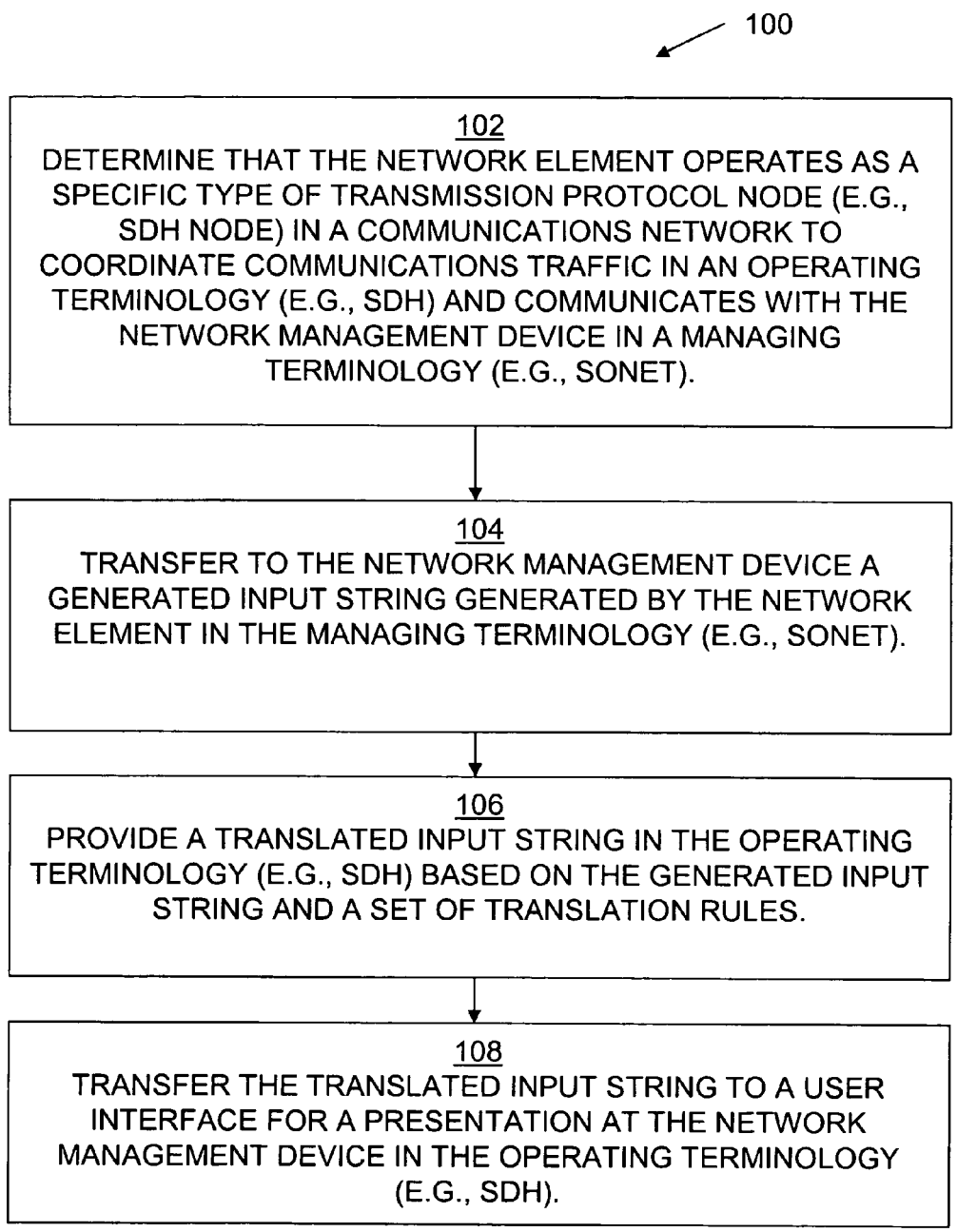
FIG. 3 is a flowchart of a procedure for translating a network management protocol between terminologies for various transmission protocols in accordance with the principles of the invention.

FIG. 3 is a flowchart of a procedure 100 for translating a network management protocol (e.g., TL-1) between terminologies for various transmission protocols (e.g., SONET and SDH) in accordance with the principles of the invention. The network management device 22 determines (step 102) that the network element 24 operates as a specific type of transmission protocol node (e.g., SDH node) in an operating mode in a communications network to coordinate communications traffic 76 in an operating terminology (e.g., SDH-based terminology) and communicates with the network management device 22 in a managing terminology (e.g., SONET-based terminology). For example, the network element 24 operates to coordinate SDH communications traffic 76, while the network element 24 communicates internally in a SONET-based terminology.

The network element 24 transfers (step 104) to the network management device 22 a generated input string 68 that is generated by the network element 24 in the managing terminology (e.g., SONET). Thus, for example, the network element 24 communicates TL-1 network management messages to the network management device 22 in the same SONET-based terminology that the network element 24 uses for its own internal communications 32 (see FIG. 1). The network management device 22 provides (step 106) a translated input string 70 in the operating terminology (e.g., SDH) based on the generated input string 68 and the set of translation rules 66. For example, the translator 62 of the network management device 22 receives the SONET-based generated input string 68 through a communications layer (not shown) through the network 55 from the network element 24, and translates the generated input string 68 to an SDH-based translated input string 70 that includes TL-1 messages based on the SONET-based generated input string 68.

The network management device 22 transfers (step 108) the translated input string 70 to the user interface software 60 for a presentation 44 at the network management device 22 in the operating terminology (e.g., SDH). For example, the translator 62 transfers the SDH-based translated input string 70 to the user interface 60 to provide an SDH-based presentation 44 on the visual display 54 of a personal computer functioning as the network management device 22. The network management device 22 is also capable of performing the inverse operation of receiving a user interface output string 72 in the operating terminology (e.g., SDH-based string) and translating the user interface output string 72 to a translated output string 74 (e.g., SONET-based string) that is directed to the network element 24. For example, a user interacts with the user interface 60 to provide SDH-based TL-1 messages in the user interface output string 72, and the translator 62 translates the messages to provide SONET-based TL-1 messages in the translated output string 74, which the network management device 22 transfers through a communications layer (not shown) and through the network 55 to the network element 24. Alternatively, the translated input string 70 and/or the user interface output string 72 are transferred to other interfaces or other devices, such as another SDH-based interface (e.g., user interface on another network device that is SDH-based, such as a user interface monitoring multiple network elements 24 operating in SDH mode). In other embodiments, the network management device 22 is capable of providing strings (e.g., 68, 70, 72, and/or 74) to other computers and/or network devices in SDH-based or SONET-based terminologies as appropriate, depending on such factors as the operating modes, communication modes, and user interface modes of the devices.

Figure 4:
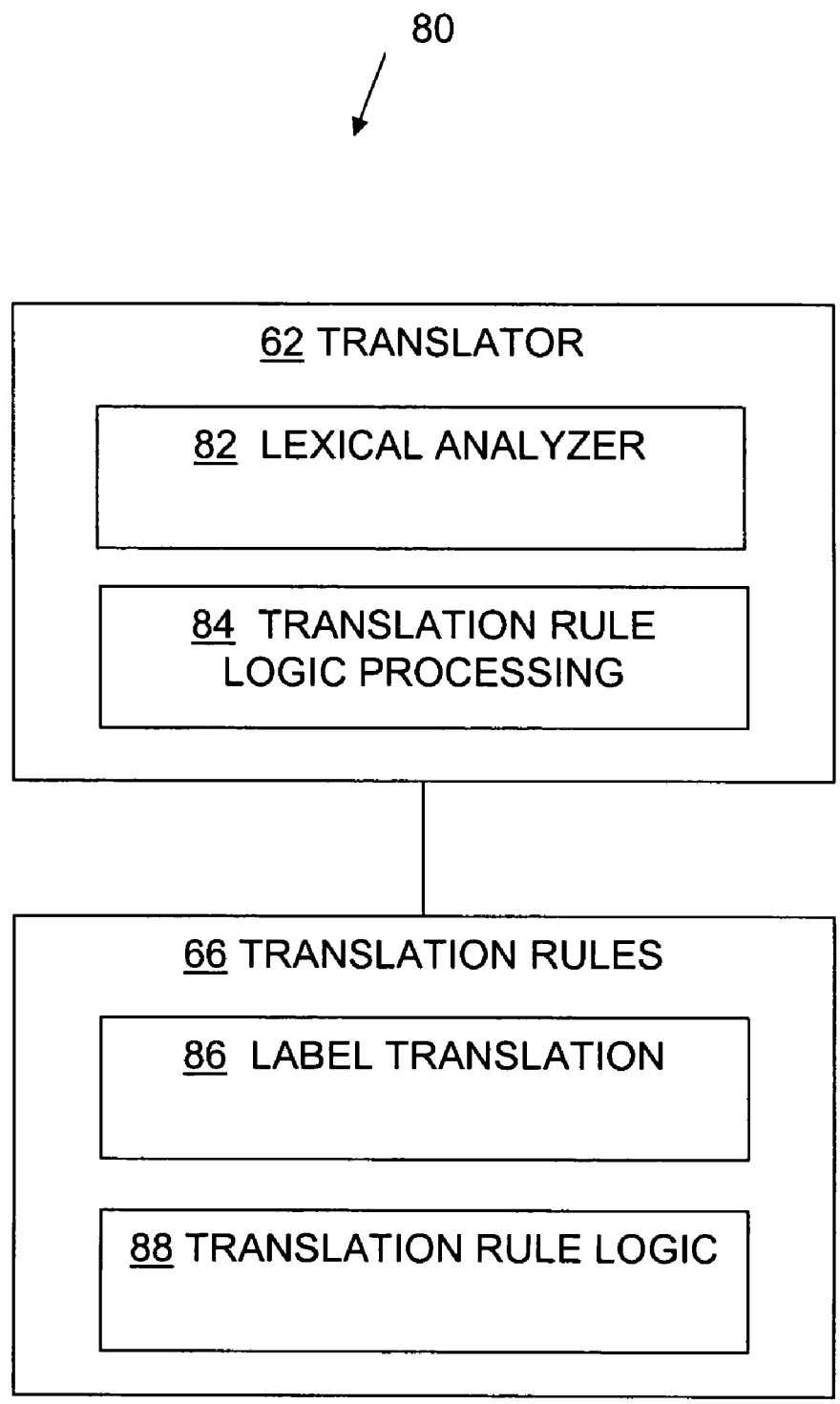
FIG. 4 is a functional block diagram of a translation system including a translator and translation rules in accordance with the principles of the invention.

FIG. 4 is a functional block diagram of a translation system 80 including the translator 62 and set of translation rules 66 in accordance with the principles of the invention. The translator includes a lexical analyzer 82 and translation rule logic processing 84. The translation rules 66 include label translation 86 and translation rule logic 88. Translation rules 66 can be of different types. In one embodiment, translations are mostly string token translations. For example, an attribute can be translated by a label translation 86 which replaces, or maps, the attribute expressed in SONET format to an equivalent expression according to the SDH format. In another example, a translation rule 66 is based on translation rule logic 88, such as a formula, or mathematical relationship, which is processed by translation rule logic processing 84 in the translator 62. Future variations in protocols (e.g., variations in the TL-1, SDH, SONET, and/or other protocols) are accommodated by modifying the affected rules in the rules files (e.g., set of translation rules 66). The rules files can be provided with the site manager software 40. Alternatively, the network element 24 can describe to the site management software 40 how to perform the appropriate translations by providing descriptive information to direct the proper translation.

Figure 5:
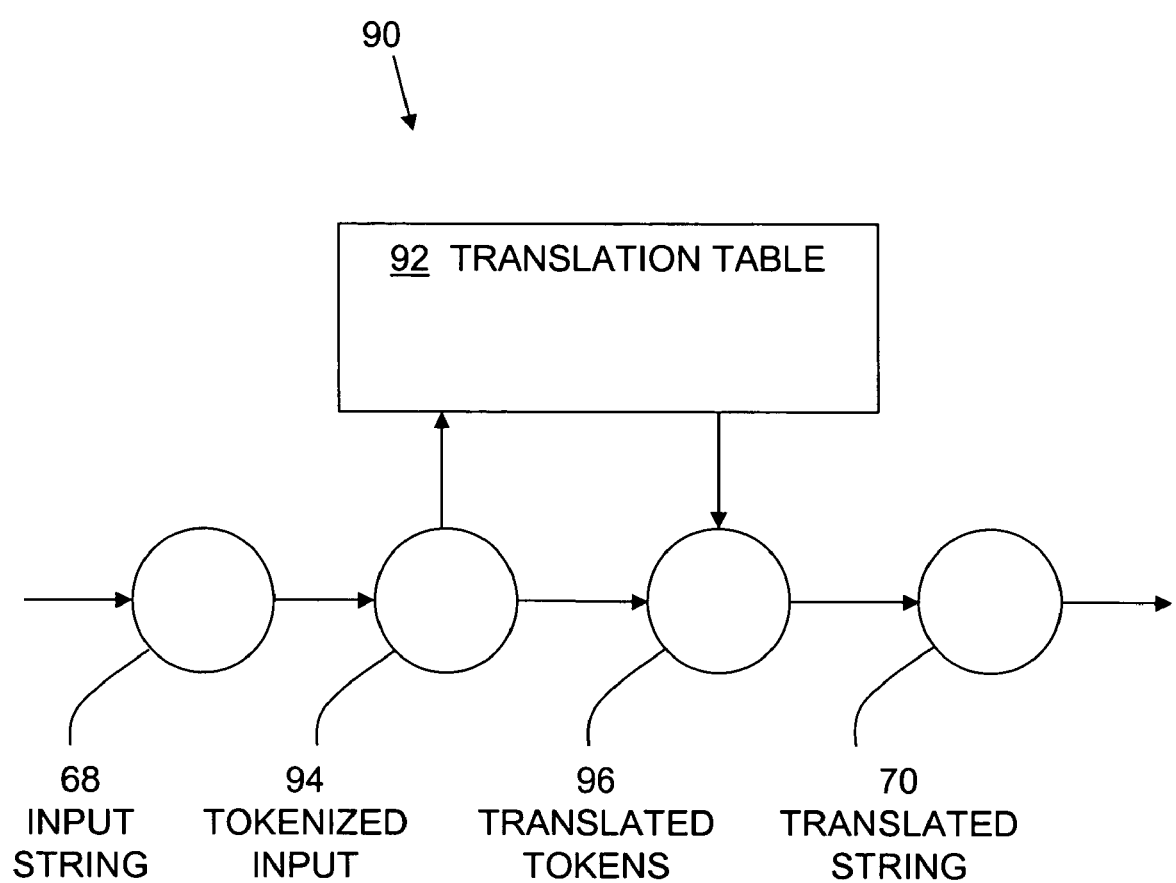
FIG. 5 is a functional diagram of a tokenization system for translating strings in accordance with the principles of the invention.

FIG. 5 is a functional diagram of a tokenization system 90 for translating strings (e.g., 68, 72) in accordance with the principles of the invention. The tokenization system 90 includes a translation table 92 that the translator 62 uses to translate tokenized input 94 into translated tokens 96. In one embodiment, the translation table 92 is represented in BNF format (see Table 1 below). In another embodiment, the translation table 92 is implemented as a set of translation rules 66, such as an XML file. Alternatively, the translation table 92 is implemented in any suitable programming language, markup language (e.g., SGML-based markup), rules scheme, or software environment.

The translator 62 includes a lexical analyzer 82 that takes the input stream of bytes (e.g., generated input string 68), tokenizes the input stream 68 according to lexical rules, performs table driven translation on the resulting tokenized input 94, then concatenates the translated tokens 96 back into a single stream (e.g., translated input string 70). In one embodiment, the translation is dependent on the tokenizing and translation rules 66, and therefore is independent of the syntax. Alternatively, the translation can apply to more than one TL-1 translation.

The tokenizing rules separate the input stream 68 into words and punctuation. There is some risk that the tokenizing rules lead to the translation of items that should not be translated, for example, user text strings, TID's (target identifiers), or user network element 24 names. In order to test for this inappropriate translation, the design activity includes running the communications logs from the site manager 40 through the translator 62. In one embodiment, the translator 62 receives a "dont_translate_list" parameter that is a means of selectively inhibiting translation token by token.

In one embodiment, the translator 62 considers a stream of text arriving (e.g., generated input string 68), which is tokenized according to token rules to produce a set of tokens as the tokenized input 94. Each token is one of (i) a special character (not alpha-numeric or "_" or "-") (note space is included) or (ii) a token_string, which is a maximal string of alphanumeric, "_" or "-" characters. For each token, the translator 62 performs one of the following: (i) the token is unchanged (moved to the output of translated tokens 96), (ii) the token is translated on a one-to-one basis by looking for an exact match in a table (e.g., translation table 92) and replacing with the corresponding string (strings support the BNF "one-of" (|) form as well as a wild card construct (<any>)), or (iii) the token is recognized as a special (e.g., AID's or access identification codes) and translated in a special way.

The translator 62 performs this recognition of tokens by looking up the tokens in the translation table 92. The translator 62 uses some entries in the translation table to 92 look for an exact match, and other entries to look for a pattern. For example, an entry of "STS3C-<any>" is used to define translation from "STS3C-<any>" to "VC-4-<any>". For real concatenation, the STS (synchronous transport signal level) number is the absolute number of the start STS-1 rather than the number in terms of the concatenation size. For example, "STS12C-3-2-5" means an "STS-12C" starting at STS-1 no. 5. Note that this is not a standards position. Finally, the translator 62 detokenizes the translated strings (i.e., translated tokens 96).

The following is a tokenization example for an input string 68:
"STS3C-3-2-4, STS3C: MJ, AIS, SA, 07-15, 14-11-56, NE, RCV, :\"STS3C Rx Alarm Indication Signal\", :YEAR=2002, CORRELATION=2345, ALRMSTAT=SET"

The first part of the input string 68 tokenizes to a sample token listing of tokenized input 94 (not a complete listing), as follows:
"
STS3C-3-2-4
,
<space>
STS3C
:
MJ
,
<space>
.
.
.
<cr>

After creating the tokenized input 94, the translator 62 looks up each token in the translation table 92 for a match. In the sample input string 68 given above, the items (tokens), "STS3C-3-2-4", "STS3C" (first instance), and "STS3C" (second instance) are matched. The other items (tokens) pass through unchanged. The following translations occur (where STS is "synchronous transport signal level" and VC is "virtual container"):

STS3C-3-2-4 maps to VC4-3-2-2, and
STS3C maps to VC4.

Note that "STS-3C-3-2-4" is the "STS-3C" starting at STS1#4 on port 2 of the card in slot 3. Also note that the last digit of the payload AID (4 in the example listing above) is the start of the payload identified by the STS-1 number for SONET. The last digit maps to the VC-4 number for SDH. This means that the following translations are required in the last digit of an AID representing the payload: (i) 1 maps to 1, (ii) 4 maps to 2, (iii) 7 maps to 3, and (iv) x maps to (x−1)/3+1. This mapping only applies where the AID represents a payload. This is recognized by "STS1", "STS(3|12|24|48|192)C" or "VC4-(1|4|8|16|64)C", "VC3-(2|3)C".

The translated tokens 96 for the sample input string 68 given above is detokenized to the translated input string 70:
"VC4-3-2-2, VC4: MJ, AIS, SA, 07-15, 14-11-56, NE, RCV, :\"VC4 Rx Alarm Indication Signal\", :YEAR=2002, CORRELATION=2345, ALRMSTAT=SET"

The above example shows translation between STS3C and VC4. In one embodiment, low order VC3's are allowed to be cross connected to VC3's in AU4's as well as into STS-1's. ("AU" refers to "administrative unit.") A high order VC3 is an STS1 in SONET terms. A low order VC3 has no equivalent in SONET terms and hence no representation in TL-1 AID's. However, low and high order VC3's need to be distinguished as they are different mappings. Hence, there is need for a SONET term to represent a low order VC3. In one embodiment, the term STS1L is used for a low order VC3. SDH does allow VC3's to be mapped into AU4's or AU3's. The normal case in SDH is to map three VC3's into one AU4. The SDH hierarchy does not name the two types of VC3's differently, although they are different. In one embodiment, they are named differently as follows: (i) VC3 is used for the low order VC3 (as this is the normal SDH case), and (ii) VC3H is used for the high order VC3 (equivalent to an STS1). Thus, there are the following necessary translations:

STS1<--->VC3H
STS1L<--->VC3

The effect on AID's is shown in the following examples:
STS1-3-2-4< >VC3H-3-2-4 (the $4^{th}$ VC3 on the second port of the $3^{rd}$ card)
STS1L-3-2-2-1< >VC3-3-2-2-1 (the $1^{st}$ VC3 of the $1^{st}$ VC4 of the $2^{nd}$ port of the $3^{rd}$ card)

Table 1 shows the translation for any TL-1-based string as (using BNF notation):

TABLE 1

| TL-1_term | SONET | SDH | TL-1 Type |
|---|---|---|---|
| (2G5\|10G\|40G) | (2G5G\|10G\|40G) | (2G5G\|10G\|40G) | all |
| OC(3\|12\|48\|192) | OC(3\|12\|48\|192) | STM(1\|4\|12\|64) | all |
| OC-(3\|12\|48\|192) | OC-(3\|12\|48\|192) | STM-(1\|4\|12\|64) | all |
| OC_(3\|12\|48\|192) | OC_(3\|12\|48\|192) | STM_(1\|4\|12\|64) | all |
| STS(12\|24\|48\|192)C-<x>-<y>-<z> | STS(12\|12\|24\|48\|192)C-<x>-<y>-<z> | VC4-(4\|8\|16\|64)C-<x>-<y>-<z'> | V1 |
| STS3C(-<n>V)-<x>-<y>-<z> | STS3C(-<n>V)-<x>-<y>-<z> | VC4(-<n>V)-<x>-<y>-<z'> | V1 |
| STS1-<any> | STS1-<any> | VC3H-<any> | V1 |
| STS1L-<a>-<b>-<d>-<f> | STS1L-<a>-<b>-<d>-<f> | VC3-<a>-<b>-<d>-<f> | V1 |
| BBE | CV | BBE | all |
| OFS | SEFS | OFS | all |
| OC(3\|12\|48\|192)-<x>-<y>-<z> | OC(3\|12\|48\|192)-<x>-<y>-<z> | STM(1\|4\|12\|64)-<x>-<y>-<z'> | 35 | where <x>, <y>, and <z'> and <z> satisfy <z'> = (<z> − 1)/3 + 1
(i.e. Z <> Z' maps as follows 1 <−>1, 4 <−>2, 7 <−>3, etc. ).

The translator 62 processes Table 1 in order and the first match is the one that is actioned. The translator 62 matches each token in the tokenized input string 94 against each entry in Table 1. On the first successful match, the translator 62 creates the output token by following the substitution rules. The translator 62 then moves to the next token in the tokenized input string 94.

STS's (a Connection Termination point) are mapped to VC4 (a path termination or STS-PTE). Although strictly speaking, VC-4 and AU4 are different items, the difference is obscured as the SDH terminology tends to use the VC4 term, and the SONET terminology tends to use the STS term. STS's need special treatment. For example, "STS12C" maps to "VC4-4C" (not a "VC44C"), and "STS3C" maps to a "VC4" (not a "VC4-1C").

The entries in Table 1 are structured to look for matches using standard regular expression recognizer concepts (| for choice, <any> for any). The approach of Table 1 is not intended to be prescriptive or limiting as to the implementation. Alternatively, the implementation uses exact pattern matches. Note that the "any" concept is specifically used to match strings that are subsets of tokens. In one embodiment, the translator 62 uses the TL-1 type column to use different translation rules 66 selectively based on the network element 24 type ("all" is a valid entry). In one embodiment, the table entries in Table 1 are implemented in a form that can be changed without causing a recompilation. The table interpreter (compiled into code) has the capabilities of (i) exact match, (ii) match on choice BNF (| | | |) (in this case the output is a repeat of the input), (iii) wild card matching (in this case the output is a repeat of the input), (iv) special (required for AID's).

While the invention has been shown and described with reference to specific preferred embodiments, it should be understood by those skilled in the art that various changes in form and detail may be made therein without departing from the spirit and scope of the invention as defined by the following claims.

What is claimed is:

1. A network for adapting a network management protocol for various transmission protocols, the network comprising:
    a storage device storing a set of translation rules for translating between (i) a network element operating terminology based on a first network communications transmission protocol and the network management protocol and (ii) a network managing terminology based on one of a synchronous optical network protocol and a synchronous digital hierarchy network protocol and the network management protocol;
    a network element operating as a first network communications transmission protocol node in a communications network to coordinate communications traffic between the network element and other network devices in the communications network based on the network element operating terminology, and providing a generated input string based on the network managing terminology network managing terminology for use within the network element and between the network element and a network management device for operations, administration, and maintenance of the network element; and
    the network management device in communication with the storage device and in communication with the network element to receive the generated input string, the network management device comprising a user interface and a translator performing translations based on the set of translation rules accessed through the storage device, wherein the translator receives the generated input string to provide to the user interface a translated input string in the network element operating terminology, and the user interface receives the translated input string from the translator and provides a presentation in the network element operating terminology based on the translated input string.

2. The network of claim 1, wherein the user interface provides to the translator a user interface output string in the network element operating terminology provided in response to the presentation; and the translator translates the user interface output string to provide a translated output string in the network managing terminology, the translated output string directed to the network element.

3. The network of claim 1, wherein the set of translation rules comprises label translation and translation rule logic.

4. The network of claim 1, wherein the set of translation rules is based on a markup language.

5. The network of claim 1, wherein the network element operating terminology is based on the other of a synchronous optical network protocol and a synchronous digital hierarchy network protocol.

6. A network management device for adapting a network management protocol for various transmission protocols, the network management device comprising:
    a storage device storing a set of translation rules for translating between (i) a network element operating terminology based on a first network communications transmission protocol and the network management protocol and (ii) a network managing terminology based on one of a synchronous optical network protocol and a synchronous digital hierarchy network protocol and the network management protocol, the network element operating terminology used by a network element operating as a first transmission protocol node in a communications network to coordinate communications traffic between the network element and other network devices in the communications network in the network element operating terminology, and the network managing terminology used for communications within the network element and between the network management device and the network element for operations, administration, and maintenance of the network element;
    a translator for performing translations based on the set of translation rules accessed through the storage device, the translator receiving a generated input string based on the network managing terminology generated by the network element, and translating the generated input string to provide a translated input string in the network element operating terminology; and
    a user interface for providing a presentation, wherein the user interface receives the translated input string from the translator and provides the presentation in the network element operating terminology based on the translated input string.

7. The network management device of claim 6, wherein the user interface provides to the translator a user interface output string in the network element operating terminology provided in response to the presentation; and the translator translates the user interface output string to provide a translated output string in the network managing terminology, the translated output string directed to the network element.

8. The network management device of claim 6, wherein the set of translation rules comprises label translation and translation rule logic.

9. The network management device of claim 6, wherein the set of translation rules is based on a markup language.

10. The network management device of claim 6, wherein the network element operating terminology is based on the other of a synchronous optical network protocol and a synchronous digital hierarchy network protocol.

11. A computer implemented method for adapting a network management protocol for various transmission protocols in a management network comprising a network management device and a network element, the computer implemented method comprising:

determining that the network element operates as a first network communications transmission protocol node in a communications network to coordinate communications traffic between the network element and other network devices in the communications network in a network element operating terminology based on a first network transmission protocol and the network management protocol, and communicates with the network management device based on a network managing terminology based on one of a synchronous optical network protocol and a synchronous digital hierarchy network protocol and the network management protocol, the network managing terminology for use within the network element and between the network element and a network management device for operations, administration, and maintenance of the network element transferring to the network management device a generated input string generated by the network element in the network managing terminology;

providing a translated input string in the network element operating terminology based on the generated input string and a set of translation rules; and transferring the translated input string to a user interface for a presentation in the network element operating terminology at the network management device.

12. The computer implemented method of claim 11, further comprising providing a translated output string in the network managing terminology based on a user interface output string provided by the user interface and the set of translation rules in response to the presentation, the translated output string directed to the network element.

13. The computer implemented method of claim 11, wherein the set of translation rules comprises label translation and translation rule logic.

14. The computer implemented method of claim 11, wherein the set of translation rules is based on a markup language.

15. The computer implemented method of claim 11, wherein the network element operating terminology is based on the other of a synchronous optical network protocol and a synchronous digital hierarchy network protocol.

* * * * *